(12) United States Patent
Isoyama et al.

(10) Patent No.: US 6,546,422 B1
(45) Date of Patent: Apr. 8, 2003

(54) CACHING OF NETWORK CONTENTS BY PACKET RELAYS THAT DETERMINE CACHE PRIORITY UTILIZING CONTENTS ACCESS FREQUENCY AND METRICS IN THEIR ROUTING TABLES REPRESENTING RELAYING PATH LENGTHS

(75) Inventors: Kazuhiko Isoyama, Tokyo (JP); Akira Arutaki, Tokyo (JP); Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/345,770

(22) Filed: Jul. 1, 1999

(30) Foreign Application Priority Data

Jul. 2, 1998 (JP) ............................. 10-187943

(51) Int. Cl.⁷ ............................................ G06F 15/173
(52) U.S. Cl. ...................... 709/225; 709/214; 709/216; 709/217; 709/219; 709/238; 709/213; 707/10
(58) Field of Search ................................. 709/200–203, 709/213–217, 219, 225, 235, 238; 711/117–119, 133; 707/10

(56) References Cited

U.S. PATENT DOCUMENTS

| | | | | |
|---|---|---|---|---|
| 5,924,116 A | * | 7/1999 | Aggarwal et al. | 709/204 |
| 5,943,672 A | * | 8/1999 | Yoshida | 707/10 |
| 6,038,601 A | * | 3/2000 | Lambert et al. | 370/468 |
| 6,112,279 A | * | 8/2000 | Wang | 711/119 |
| 6,167,438 A | * | 12/2000 | Yates et al. | 709/216 |
| 6,170,013 B1 | * | 1/2001 | Murata | 709/229 |
| 6,182,111 B1 | * | 1/2001 | Inohara et al. | 709/201 |
| 6,256,675 B1 | * | 7/2001 | Rabinovich | 709/225 |
| 6,266,742 B1 | * | 7/2001 | Challenger et al. | 711/133 |
| 6,330,561 B1 | * | 12/2002 | Cohen et al. | 707/10 |

FOREIGN PATENT DOCUMENTS

| | | | | |
|---|---|---|---|---|
| JP | 9-251414 | 9/1997 | | G06F/12/00 |
| JP | 9-282289 | 10/1997 | | G06F/15/16 |
| JP | 9-330265 | 12/1997 | | G06F/12/00 |
| JP | 10-31615 | 2/1998 | | G06F/12/00 |
| JP | 10-49422 | 2/1998 | | G06F/12/00 |
| WO | 94/01964 | 1/1994 | | H04N/1/00 |
| WO | 95/21415 | 8/1995 | | G06F/15/16 |

* cited by examiner

Primary Examiner—Nabil El-Hady
(74) Attorney, Agent, or Firm—Sughrue Mion, PLLC

(57) ABSTRACT

A caching method for caching network contents of a packet transfer network including a packet relay for relaying accesses of clients to servers supplying contents, and a network contents cache device are disclosed. Accesses from the clients to the servers are monitored by the said packet relay to determine a cache priority on the basis of a product of relaying path lengths from the packet relay to the server and frequency of access from the client to the servers and the network contents cache device preferentially caches a response to the access to the server having higher cache priority.

4 Claims, 8 Drawing Sheets

Fig.4

| DESTINATION | MASK | METRICS | NEXT ROUTER | INTERFACE |
|---|---|---|---|---|
| 10.1.2.0 | 255.255.255.0 | 0 | | PORT1 |
| 10.1.3.0 | 255.255.255.0 | 1 | 10.1.1.1 | PORT2 |
| 192.1.1.0 | 255.255.255.0 | 3 | 10.1.1.1 | PORT2 |

CACHING OF NETWORK CONTENTS BY PACKET RELAYS THAT DETERMINE CACHE PRIORITY UTILIZING CONTENTS ACCESS FREQUENCY AND METRICS IN THEIR ROUTING TABLES REPRESENTING RELAYING PATH LENGTHS

BACKGROUND OF THE INVENTION

1. Field of the Invention

The present invention relates to an access to content servers in a packet transfer network and, particularly, to a caching of network contents.

2. Description of the Related Art

In a known caching method of network contents, in which a server and clients are arranged through a network and a cache device is provided in the network, the cache device monitors accesses of the clients to the server and directly returns responses corresponding to accesses similar to the monitored accesses to the clients.

In each of Japanese Patent Application Laid-open Nos. Hei 9-251414 and Hei 10-31615 which relate to such network caching method discloses a construction in which a cache device caches for all accesses to a server. Further, in Japanese Patent Application Laid-open No. Hei 9-330265, respective clients have their own cache devices and use a cache information commonly.

Japanese Patent Application Laid-open No. Hei 10-49422 discloses a cache device, which caches an access to a server having high access frequency, preferentially, and, when a finite caching capacity of the cache device is going to overflow, deletes the caching content to hold an available cache capacity. FIG. 8 shows a flowchart of an operation of the above mentioned cache device. As shown in FIG. 8, a packet is received (step S31) and it is determined whether or not the received packet is an HTTP (Hypertext Transfer Protocol) packet (step S32). If the packet is the HTTP packet (Yes in step S32), then it is determined whether or not the packet is a request packet from a server (step S33). If the packet is a response packet to a request from a server (No instep S33), the cache device checks a cache capacity as to whether or not it is short (step S38). If the cache capacity is enough (No in step S38), the cache device caches the received response corresponding to the request having a certain access frequency (step S39). If the cache capacity is short (Yes in step S38), the cache device searches any packet having lower access frequency (step S41). If there is such packet therein (Yes in step S41), the cache device deletes such packet (step S42) and caches the received response (step S39).

Further, Japanese Patent Application Laid-open No. Hei 9-282289 discloses a cache method in which an arrangement of a cache device in a network is automatically determined on the basis of the access frequency to a server and the route length to the server.

In the network system disclosed in either Japanese Patent Application Laid-open No. Hei 9-251414 or Japanese Patent Application Laid-open No. Hei 10-31615, the cache device performs the caching for all accesses to the server. Therefore, when there are accesses beyond the finite cache capacity, it is impossible to perform an efficient caching with which the coefficient of use of network resources becomes optimal. Further, in Japanese Patent Application Laid-open No. Hei 9-330265, in which the clients have the cache devices, respectively, to use the cache information commonly, it is impossible to perform a caching by taking the coefficient of use of network resources into consideration.

In the cache device disclosed in Japanese Patent Application Laid-open No. Hei 10-49422, the efficient use of the network resources is taken into consideration and the caching for the access to the server, whose access frequency is high, is performed preferentially as shown in FIG. 8. However, such cache device can not perform efficient caching in view of the coefficient of use of the network since, if the length of route to the server is large, more resources of the network are consumed for each access even when the frequency of the latter is low.

Further, in the network system disclosed in Japanese Patent Application Laid-open No. Hei 9-282289, the arrangement of cache devices in the network is determined on the basis of the frequency of access to the server and the route length to the server. However, such information is not considered in determining a cache in a cache site and, therefore, it is impossible to perform a caching by taking the coefficient of use of the network into consideration.

In these prior arts mentioned above, it is difficult to realize an efficient caching in view of the coefficient of use of the network.

SUMMARY OF THE INVENTION

An object of the present invention is to provide a caching method of network contents and an apparatus for performing the same method, which enable a caching of the network contents with minimum use of network resources.

According to a first aspect of the present invention, a caching method of network contents of a packet transfer network including a packet relay for relaying accesses of clients to servers supplying the contents is featured by that the packet relay monitors accesses from the clients to the servers, determines a cache priority on the basis of a product of relaying path lengths between the packet relay and the servers and the frequency of access from the clients to the servers and preferentially caches responses to the accesses to servers, which have high cache priority.

According to a second aspect of the present invention, a caching method of network contents of a packet transfer network including packet relays for relaying accesses of clients to servers supplying the contents is featured by that, after a first packet relay caches a response to an access to a specific server, a second packet relay compares the length of relaying path between the second packet relay and the server with the length of relaying path between the second packet relay and the first packet relay, for the same access to the server in the second packet relay, and transfers the access to the first packet relay when the route length between the second packet relay and the first packet relay is smaller than compares the length of relaying path between the second packet relay and the server.

According to a third aspect of the present invention, a cache device for network contents, which includes a first and second termination devices connected to a client side network and a server side network, respectively, a switch device connected between the first and second termination devices and a cache server connected to the switch device, is featured by that the switch device transfers a request packet from the client to either the server side network and the cache server or the cache server, depending upon the state of cache of a response of the cache server, transfers the response packet from the server to the network and the cache server on the client side and transfers the response packet from the cache server to the network on the client side and that the cache server determines a cache priority of the response from the server on the basis of a product of relaying path lengths and the access frequency to the server, which is calculated on the basis of the received request packet, preferentially caches the response corresponding to the access to the server, which has a high cache priority, on the basis of the response packet from the server and, after the response is cached, returns the response packet having the cached response corresponding to the access packet to the switch device.

According to the present invention, in determining the priority of cache of the contents, the length of relaying path up to the server is used in addition to the frequency of access to the server. Therefore, a server access through a long route up to the server and consuming a large network resources is cached in access unit (from a client access to a server to a response thereto) even when the frequency of access to the server is low to some extent. On the contrary, an access through a short route to the server and consuming small network resources is not cached in access unit even if the access frequency is high to some extent. In this manner, the caching is realized by a finite cache capacity with minimum consumption of network resources.

BRIEF DESCRIPTION OF THE DRAWINGS

FIG. 4 shows an example of a routing table used in the present invention;

DETAILED DESCRIPTION OF THE PREFERRED EMBODIMENTS

Figure 1:
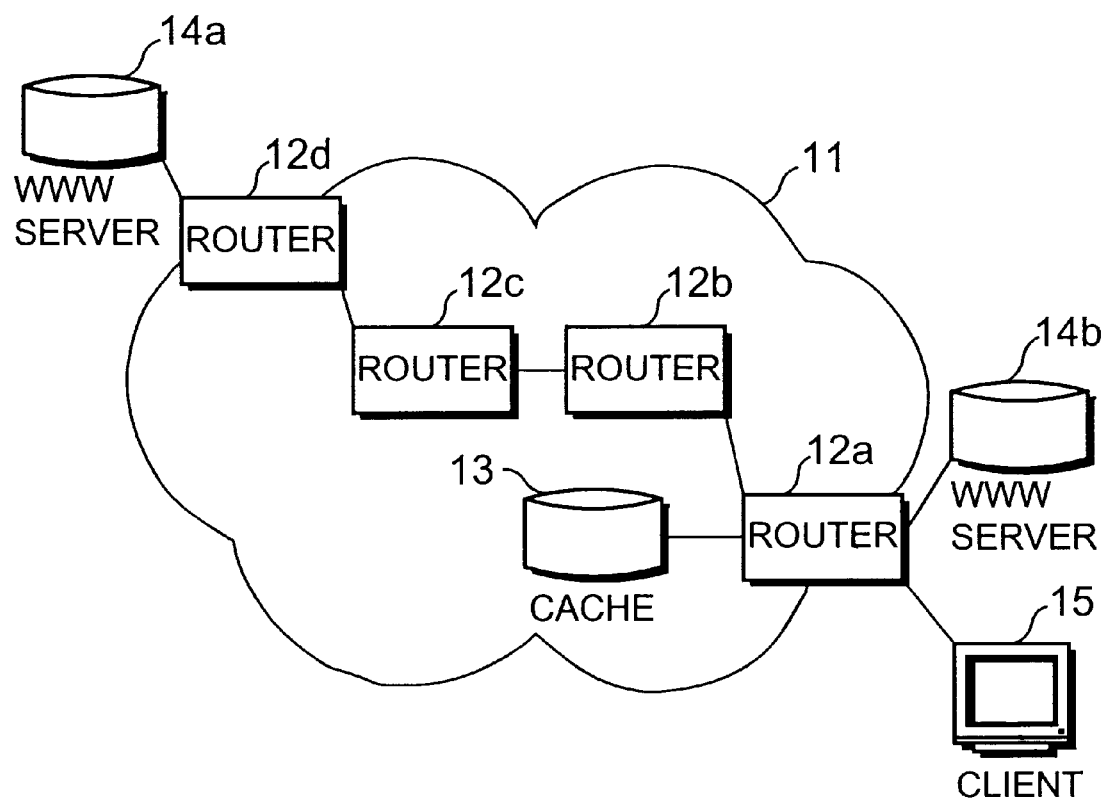
FIG. 1 shows a network construction for realizing a network cache method according to the present invention.

FIG. 1 shows a first embodiment of a network in which the network contents cache method of the present invention is performed. In FIG. 1, WWW (World Wide Web) servers 14a and 14b and a client 15 are connected each other through a network 11. The network 11 is constructed with routers 12a, 12b, 12c and 12d and a network contents cache device (referred to as a "cache device", hereinafter) 13 is mounted on the router 12a.

Figure 2:
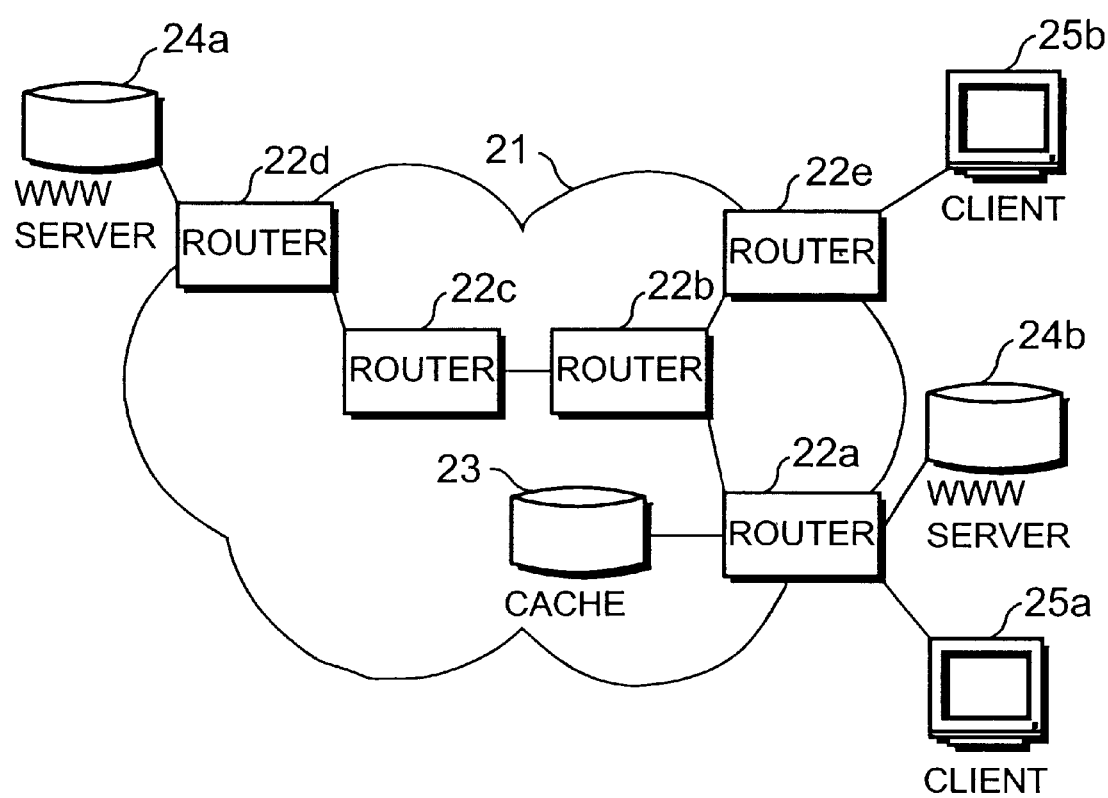
FIG. 2 shows another network construction for realizing a network cache method according to the present invention.

FIG. 2 shows a second embodiment of the network in which the network contents cache method of the present invention is performed. The second embodiment shown in FIG. 2 is constructed with WWW servers 24a and 24b and clients 25a and 25b through a network 21 which is constructed with routers 22a, 22b, 22c, 22d and 22e. A cache device 23 is mounted on the router 22a.

Figure 3:
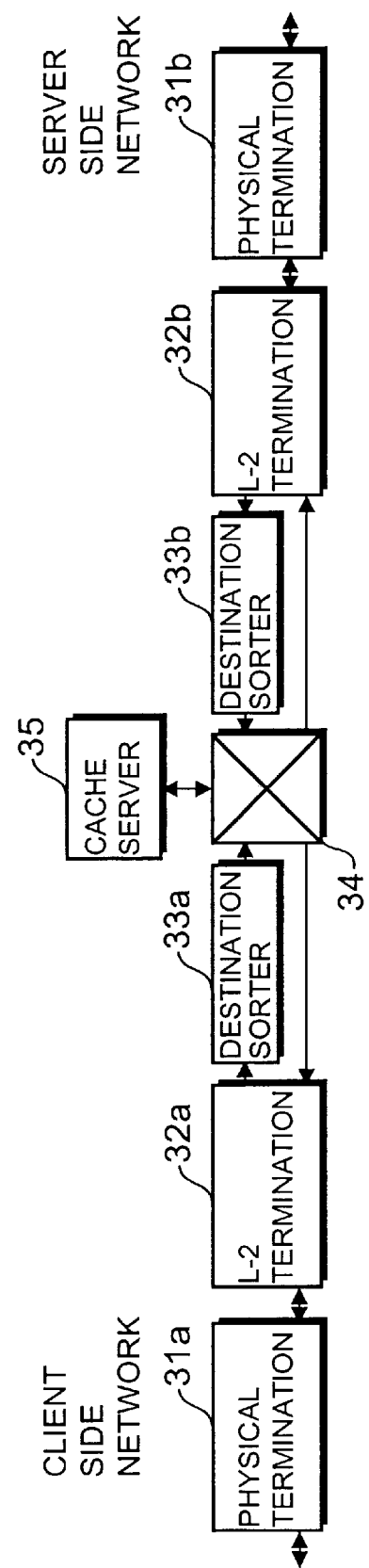
FIG. 3 is a block diagram showing a construction of a network contents cache device according to the present invention.

FIG. 3 shows an example of the cache device 13 (23) for executing the network contents cache method of the present invention. The cache device is connected to other network devices through physical termination devices 31a and 31b. Packets received by the physical termination devices 31a and 31b are terminated by layer-2 termination devices 32a and 32b and, then, transmitted to destination sorters 33a and 33b which determine destinations of packet transfer on the basis of IP addresses and layer-4 port numbers of the packets, respectively. The packets are transferred to the respective destinations determined by the destination sorters 33a and 33b, by a switch 34. The transfer operation realized by the destination sorters 33a and 33b and the A switch 34 makes a multi-cast for transferring one packet to a plurality of destinations possible. A cache server 35 caches a response to a server access and sets destinations of the destination sorters 33a and 33b for same sever accesses as the cached previous server access such that the same server accesses are transferred to only the cache server 35.

<First Embodiment>

An operation of the first embodiment of the network contents cache method and apparatus of the present invention will be described with reference to FIGS. 1 and 3.

In a case where the client 15 accesses the WWW server 14a, an HTTP request packet having destination to the WWW server 14a is transmitted from the client 15 to the router 12a. Then, the router 12a transfers the request packet to the router 12b on the basis of a routing table. Then, the request packet is transferred to the router 12c and, then, to router 12d in a similar manner and finally reaches the WWW server 14a.

The WWW server 14a transmits a response packet containing contents related to the request and having a destination to the client 15 to the router 12d. The response packet is then transferred to the router 12c, the router 12b and then the router 12a in the opposite direction to the route of the request packet and finally reaches the client 15.

In this case, the cache device 13 monitors accesses of the client 15 to the WWW server 14a to record an information of the frequency of access to the WWW server 14a and the relaying path length from the client 15 up to the WWW server 14a and determines the cache priority of the server access on the basis of the information of the access frequency and the relaying path length. Then, the caching is performed for the access having the highest priority, first, and, then for other accesses having lower priorities in the priority order. In this embodiment, metrics in the routing table shown in FIG. 4 is used as the information related to the route length. As shown in FIG. 4, the routing table is written with destination addresses, addresses of next routers, port numbers of an interface and metrics up to the destination of transfer, which can be acquired by masks obtained from the IP address.

The router 12a calculates metrics up to the destination network according to the routing protocol to determine the route of transfer. The metrics of the routing table is expressed by the number (hop number) of routers passed through by the packet until the latter reaches the destination network, although it depends upon the routing protocol to be used.

Therefore, the router 12a can utilize the metrics of the routing table as an amount of the network resources used during a time from the one access of the client to the WWW server 14a up to the response thereto (access unit).

For example, the metrics of the access of client to the WWW server 14a is larger than that to the WWW server 14b. Therefore, when the access frequencies thereof are the same, the cache priority of the server access to the WWW server 14a is set to a value larger than that of the access to the WWW server 14b such that the access to the WWW server 14a is cached preferentially.

When the router 12a receives a next request packet from the client 15 to the WWW server 14a after the response to the previous server access to the WWW server 14a is cached by the cache device 13, the router 12a causes the cache device 13 to process the next request packet without transferring it to the WWW server 14a and returns the response of the WWW server 14a, which is cached in the cache device 13, to the client 15.

An operation of the cache device shown in FIG. 3 will be described in detail.

Figure 5:
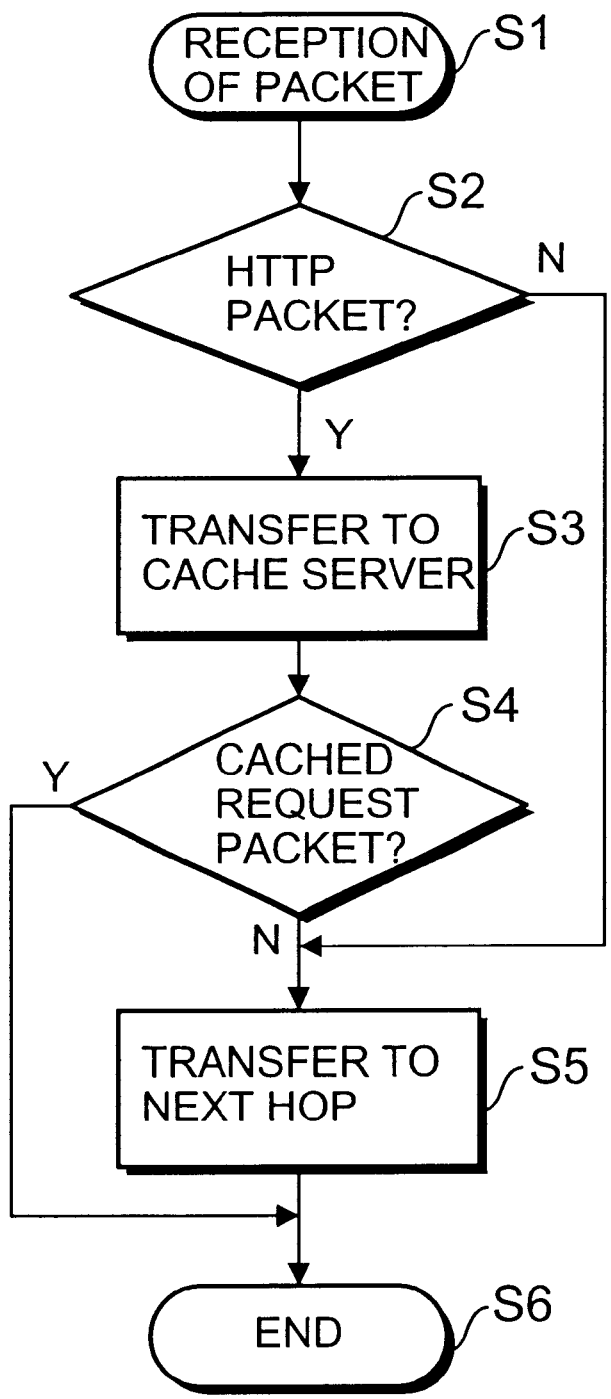
FIG. 5 shows a flowchart of an operation of a destination sorter of the network contents cache device according to the present invention.
Figure 6:
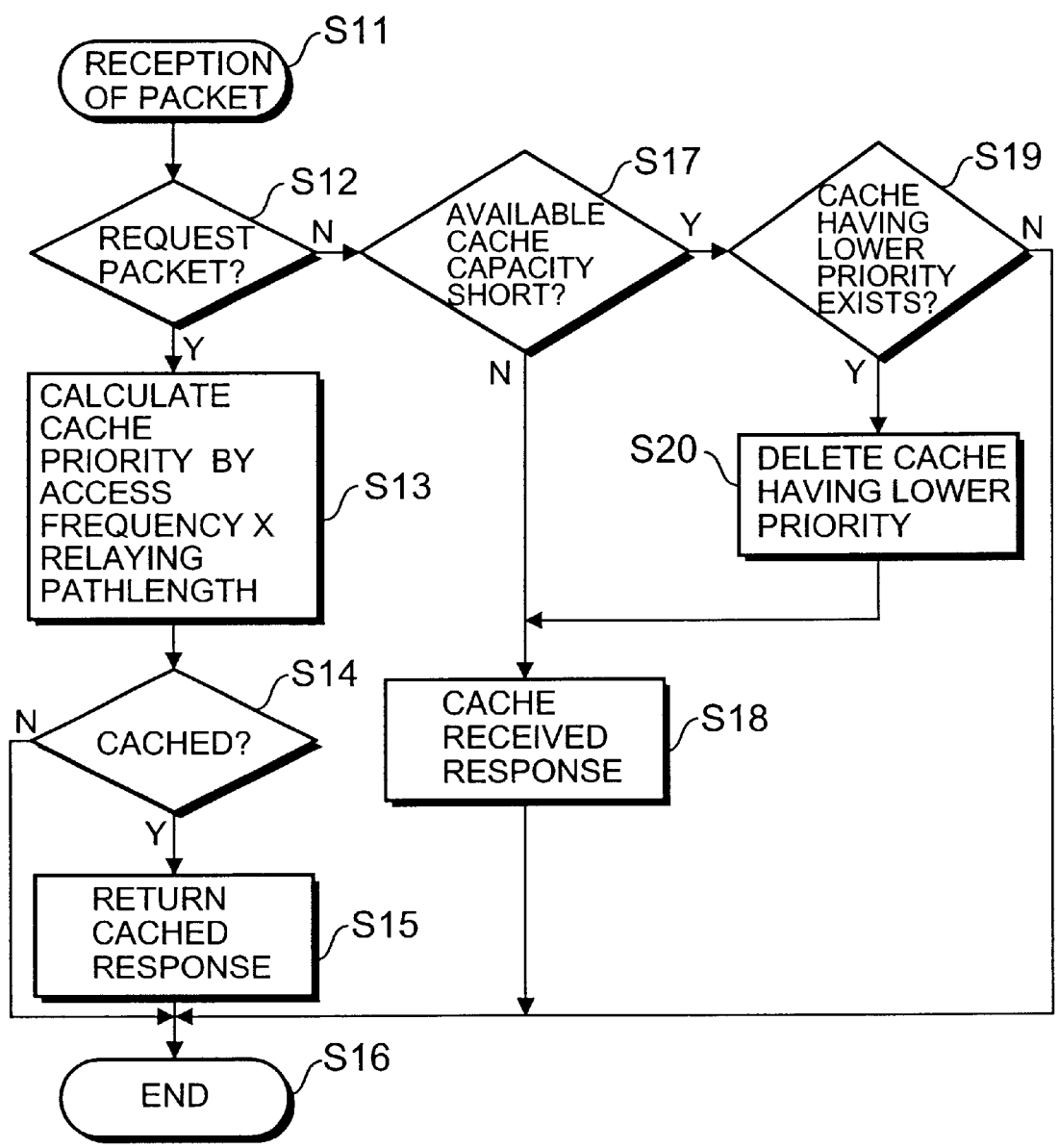
FIG. 6 shows a flowchart of an operation of a cache server of the network contents cache device according to the present invention.

FIG. 5 shows a flowchart of the destination sorter shown in FIG. 3, which performs a packet transfer, and FIG. 6 shows a flowchart of the operation of the cache server also shown in FIG. 3. As shown in FIG. 5, when the destination sorters 33a and 33b receive packets (step S1), it is determined whether or not the received packets are HTTP packets (step S2). If they are HTTP packets (Yes in step S2), then the destination sorters transfer the packets to the cache server 35 (step S3). In the cache server, it is determined whether or not the received packets are response packets and cached (step S4). If the received packets are not the response packets, which are cached (No in step S4), the destination sorters control a transfer to a next hop (step S5) The cache server 35 performs the setting of this transfer control.

Further, as shown in FIG. 6, the cache server 35 uses the product of the access frequency and the relaying path length as the cache priority and, when the received HTTP packet (step S11) is a response packet from the server to the request (No in step S12), checks the cache capacity (step S17). When the available cache capacity is enough, the cache server caches the received response corresponding to the request having high cache priority (step S18). If the available cache capacity is short (Yes in step S17), the cache server 35 searches a cache having a lower cache priority (step S19) and, after its cache is deleted (step S20), controls the caching of the response (step S18).

Figure 7:
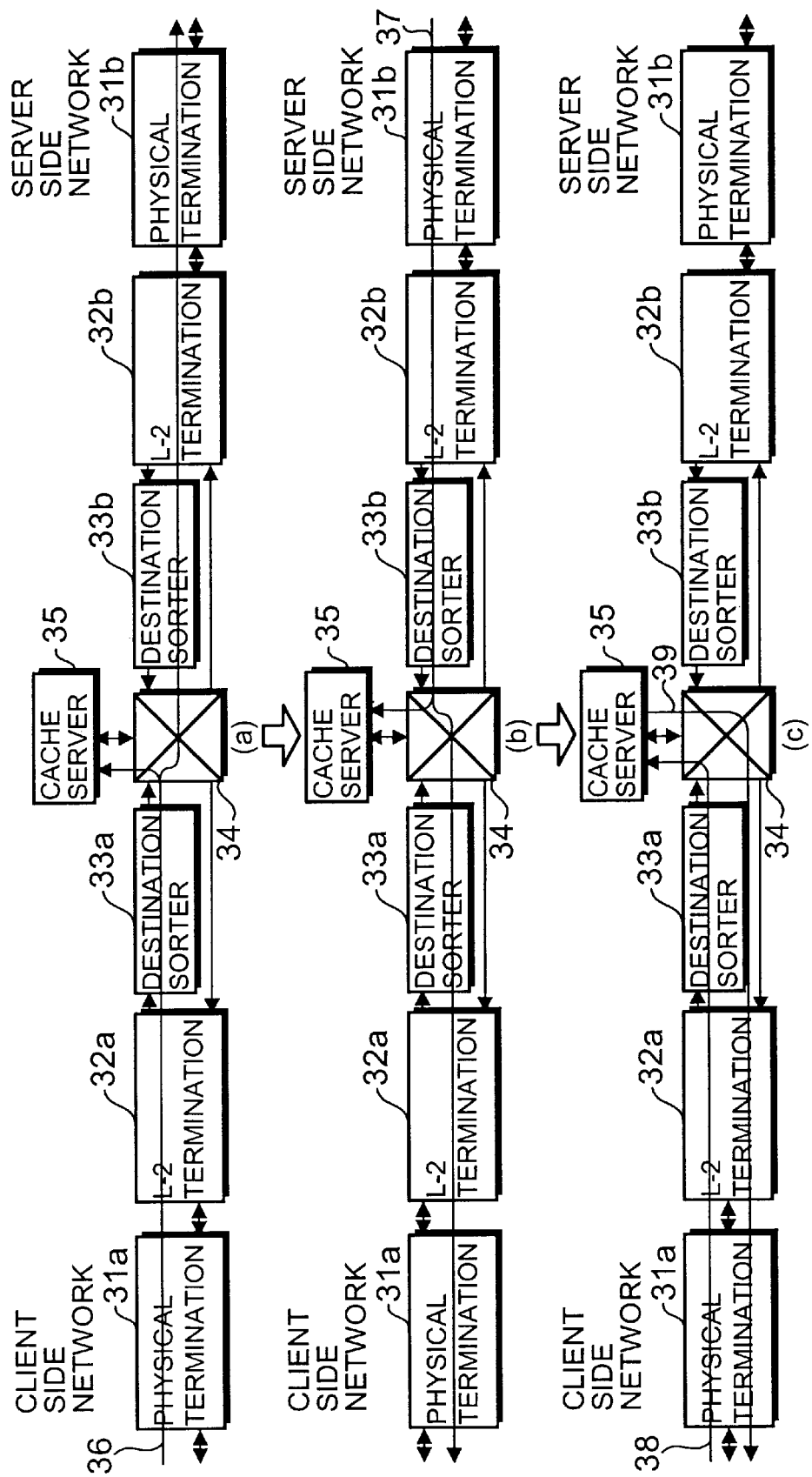
FIG. 7 shows block diagrams of the network contents cache device according to the present invention, showing an operation thereof.
Figure 8:
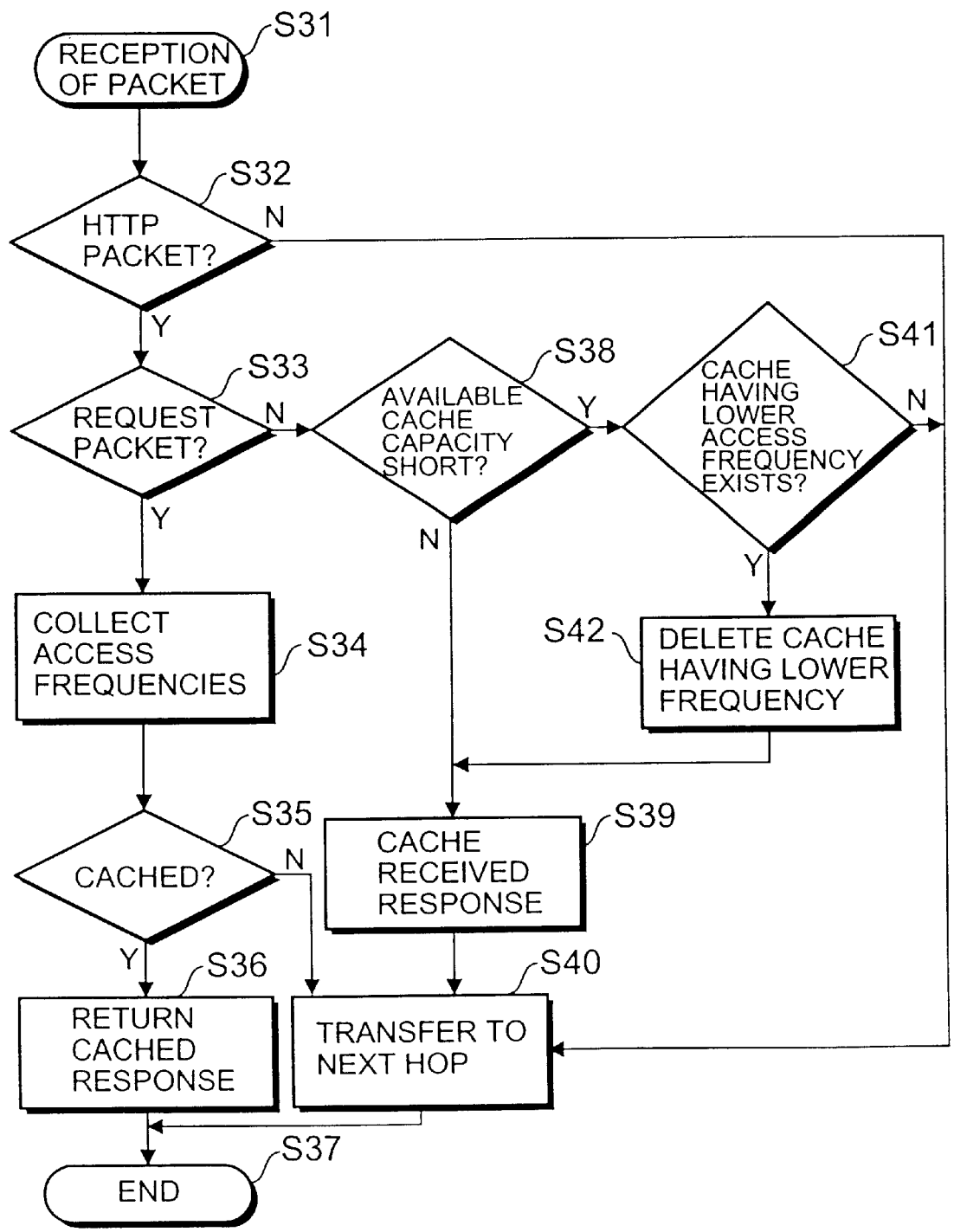
FIG. 8 shows a flowchart of an operation of a cache server of the conventional network contents cache device.

FIGS. 7(a) to 7(c) show a detailed operation of the cache device of the present invention.

The IP destination address of a request packet 36 from the client 15 to the WWW server 14a, which is terminated by the physical termination device 31a and the layer-2 termination device 32a, is referenced by the destination sorter 33a to determine a transfer route according to the routing table. Simultaneously, the destination sorter 33a references the layer-4 port number of the request packet 36 and, when the packet 36 is identified as an HTTP packet, it is transferred to the cache server 35. The switch 34 transfers the packet 36 to the network on the side of the WWW server 14a and to the cache server 35 according to the determination made by the transfer destination distributor (FIG. 7(a)).

The cache server 35 calculates the access frequency to the server 14a on the basis of a count of the request packets 36 received by the cache server 35 and searches the routing table shown in FIG. 3 by using the destination IP address of the packet 36 to obtain the metrics up to the server 14a. The cache server 35 calculates a product of the access frequency and the metrics as the cache priority.

Similarly, a response packet 37 transferred from the WWW server 14a is transferred to the network on the client side, which is the destination, and, simultaneously, to the cache server 35. The cache server 35 caches the received response packet 37. When the available cache capacity is short, the cache server 35 deletes a cache of an access having a cache priority lower than that of the response packet 37 and then caches the response packet 37. If there is no cache having access priority lower than that of the response packet 37, the cache server 35 does not cache the response packet 37 (FIG. 7(b)).

After the response packet is cached, the cache server 35 sets the destination sorters 33a and 33b such that the cache server 35 does transfer request packets corresponding to the cached response not to the network on the server side but to only the cache server 35. Thereafter, a request packet 38 to the WWW server 14a is transferred to only the cache server 35 and the cache server 35 returns a response packet 39 corresponding to the request packet 38 cached by the cache server 35 (FIG. 7(c)).

When the cached response is deleted or the caching time thereof is over, the cache server 35 initializes the setting of the destination sorters 33a and 33b such that a response corresponding thereto is transferred to the network on the server side.

In this embodiment, the contents of the WWW server 14a are unity and the request/response can be made correspondent to the contents by only the IP address of the WWW server 14a. However, when there are a plurality of contents in the WWW server 14a, the correspondence between the request/response and the contents is provided by using identifiers (such as URL (Uniform Resource Locator)) for identifying the contents, in addition to the IP addresses of the WWW server 14a.

<Second Embodiment>

An operation of the second embodiment of the present invention will be described with reference to FIG. 2.

The embodiment shown in FIG. 2 is constructed with the WWW servers 24a and 24b and the clients 25a and 25b, which are connected each other through the network 21 which is constructed with the routers 22a, 22b, 22c, 22d and 22e. The cache device 23 is mounted on the router 22a, as mentioned previously.

The operation of the second embodiment is similar to that of the first embodiment and the cache operation is performed in the cache device 23. In this case, the router 22a notifies the other routers 22b, 22c, 22d and 22e of an address of the router 22a and an identifier of a cached access (such as an address of the server 24a, URL, etc.). Upon reception of the address of the router 22a and the identifier of the cached access, the routers 22b, 22c, 22d and 22e compare the metrics up to the server 24a with the metrics up to the router 22a according to the routing table within the routers. When the metrics up to the router 22a is smaller, the destination sorter is set such that the request packet corresponding to the cached access is transferred to not the server 24a but the router 22a.

Thereafter, the router 22e, which receives the same request packet sent from the client 25b toward the server 24a, transfers the request to the router 22a and the router 22a returns the cached response corresponding to that request to the client 25b as in the case of the first embodiment.

When the caching time of the response cached in the cache device 23 is over or the cached response is deleted, the router 22a notifies the other routers 22b, 22c, 22d and 22e of the address of the router 22a and the identifier of the access which was deleted or whose caching time was over. The routers 22a, 22b, 22c, 22d and 22e set their destination sorters such that the request packet of the corresponding server access is transferred again to the WWW server 24a, and are returned to the initial states.

The first and second embodiments, which use the metrics in the routing table as the information related to the relaying path length up to the server, have been described. However, in a case where an IP over ATM is used as the packet transfer network, it is possible to use a geographic distance up to the server, etc., which is obtainable from the ATM address (E164 address) corresponding to the IP address of the server, etc., as the relaying path length.

As described hereinbefore, according to the network contents cache method of the present invention, since the relaying path length up to the server, etc., is taken into consideration in determining the cache priority, the cache is performed on the basis of the amount of consumption of the network resources even when the amount of the network resources used by in access unit varies dependent on the position of server. Therefore, it becomes possible to perform the network cache with a finite cache capacity and with minimum network resource consumption.

Further, according to the cache device of the present invention, the transfer is performed to the cache server and the designated network simultaneously by the multi-cast. Therefore, the cache processing does not influence on the transfer delay between the client and the server, so that the network cache becomes possible without delay in access to the server.

What is claimed is:

1. A caching method for caching network contents of a packet transfer network, including packet relays for relaying accesses of clients to servers supplying contents, wherein a packet relay monitors accesses from said clients to said servers and caches responses corresponding to the accesses having higher accessing frequency and consuming larger resources, preferentially, when said packet relay monitors the accesses that corresponding responses are already cached in said packet relay, said packet relay returns the cached responses to said clients, comprising:

monitoring accesses from said clients to said servers, by said packet relay;

determining a cache priority by said packet relay on the basis of a product of relaying path lengths from said packet relay to said servers and the frequency of access from said clients to said servers;

preferentially caching a response to said access to one of said servers having higher cache priority; and deleting an access having lower cache priority when a cache capacity becomes short for caching of a response corresponding to an access;

wherein metrics up to said servers described in a routing table of said packet relay is used in lieu of a relaying path length.

2. A network contents cache device comprising:

a first and second termination devices connected to a client side network and a server side network, respectively;

a switch device connected between said first and second termination devices;

a destination sorter connected between said switch device and at least one of said first and second termination devices; and a cache server connected to said switch device, said switch device being adapted to transfer a request packet from a client to either both said server side network and said cache server or said cache server depending upon a caching state of response of said cache server, to transfer a response packet from a server to said client network and said cache server on the client side and to transfer a response packet from said cache server to said client network on the client side, said cache server being adapted to determine a cache priority of the response from said server on the basis of a product of relaying path length and access frequency to said server, which is calculated on the basis of a received request packet, to cache the response to an access to said server having high cache priority on the basis of the response packet from said server and, after the response is cached, to return the response packet having the response cached with respect to an access packet corresponding to a cache to said switch device;

said destination sorter determines a destination of transfer of a packet received thereby and said switch device outputs said packet to said destination, and said destination sorter controls a transfer of the packet correspondingly to a caching state of the response in said cache server.

3. A network contents cache device as claimed in claim 2, wherein said cache server deletes a cache of an access having lower cache priority when an available cache capacity is short, and caches an access having higher cache priority.

4. A network contents cache device as claimed in claim 3, wherein said cache server re-sets said destination sorter in such a way that said destination sorter transfers a request packet from a client corresponding to a response cached by said cache server to a network on a side of said cache server, when a caching time of the cache response is over or the cached response is deleted.

* * * * *